United States Patent
Langervik

(10) Patent No.: US 6,536,381 B2
(45) Date of Patent: Mar. 25, 2003

(54) VEHICLE LUBRICANT TEMPERATURE CONTROL

(75) Inventor: Dennis Langervik, Greensboro, NC (US)

(73) Assignee: Volvo Trucks North America, Inc., Greensboro, NC (US)

(*) Notice: Subject to any disclaimer, the term of this patent is extended or adjusted under 35 U.S.C. 154(b) by 0 days.

(21) Appl. No.: 09/789,032

(22) Filed: Feb. 20, 2001

(65) Prior Publication Data

US 2002/0112679 A1 Aug. 22, 2002

(51) Int. Cl.[7] .............................................. F01P 11/08
(52) U.S. Cl. ............................. 123/41.33; 123/196 AB; 123/41.29
(58) Field of Search ..................... 123/41.29, 41.3, 123/41.31, 41.33, 41.55, 41.56, 41.57, 196 AB

(56) References Cited

U.S. PATENT DOCUMENTS

| | | | | |
|---|---|---|---|---|
| 2,446,995 A | * | 8/1948 | Bay ........................ | 123/41.08 |
| 3,147,823 A | | 9/1964 | Killackey et al. ............... | 184/6 |
| 3,797,562 A | | 3/1974 | Brille et al. ................... | 165/39 |
| 4,041,697 A | | 8/1977 | Coffinberry et al. ... | 60/39.28 R |
| 4,063,431 A | | 12/1977 | Dankowski .................. | 62/239 |
| 4,249,491 A | * | 2/1981 | Stein .................... | 123/142.5 E |
| 4,325,219 A | | 4/1982 | Stang et al. .................. | 60/599 |
| 4,362,131 A | * | 12/1982 | Mason et al. ............... | 123/41.1 |
| 4,424,775 A | * | 1/1984 | Mayfield et al. ....... | 123/142.5 R |
| 4,535,729 A | | 8/1985 | Faylor ....................... | 123/41.1 |
| 4,545,334 A | * | 10/1985 | Nakagawa et al. ... | 123/196 AB |
| 4,546,742 A | | 10/1985 | Sturges ..................... | 123/41.05 |
| 4,885,911 A | * | 12/1989 | Woollenweber et al. . | 123/41.49 |
| 4,926,800 A | | 5/1990 | Valev ....................... | 123/41.42 |
| 5,215,044 A | | 6/1993 | Banzhaf et al. .......... | 123/41.29 |
| 5,390,632 A | * | 2/1995 | Ikebe et al. ............... | 123/41.02 |
| 5,598,705 A | | 2/1997 | Uzkan ......................... | 60/599 |
| 5,730,089 A | * | 3/1998 | Morikawa et al. ........ | 123/41.14 |
| 5,887,562 A | * | 3/1999 | von Esebeck et al. | 123/196 AB |
| 5,896,833 A | * | 4/1999 | Aoki ........................ | 123/41.14 |
| 5,910,099 A | | 6/1999 | Jordan, Jr. et al. ............ | 60/599 |
| 6,021,868 A | * | 2/2000 | Bogema ................... | 184/104.2 |
| 6,178,928 B1 | * | 2/2001 | Corriveau ................. | 123/41.12 |
| 6,354,089 B1 | * | 3/2002 | Lech et al. .................. | 62/50.2 |
| 2002/0050251 A1 | * | 5/2002 | Takahashi et al. .......... | 123/41.1 |

FOREIGN PATENT DOCUMENTS

| | | | | |
|---|---|---|---|---|
| JP | 231451 | * | 9/1993 | ........... F16D/57/00 |
| JP | 264318 | * | 9/1999 | ........... F01P/11/08 |
| JP | 82590 | * | 3/2001 | ........... F16H/41/30 |

* cited by examiner

Primary Examiner—Henry C. Yuen
Assistant Examiner—Hai H. Huynh
(74) Attorney, Agent, or Firm—Watts, Hoffmann, Fisher & Heinke Co., L.P.A.

(57) ABSTRACT

An oil cooling system is disclosed in the environment of an over the road vehicle having a transmission and an internal combustion engine. A primary liquid to liquid heat exchanger is connected to the engine cooling system and connected to a selected on of, or both, an engine lubricant system and the transmission for cooling circulation of oil. An auxiliary heat exchanger is connected in parallel with the primary heat exchanger for selective additional cooling circulation of the oil.

21 Claims, 2 Drawing Sheets

VEHICLE LUBRICANT TEMPERATURE CONTROL

TECHNICAL FIELD

This invention relates to over the road vehicles and more particularly to a system for cooling power train liquids such as engine lubricants and transmission oil.

BACKGROUND ART

Over the over the road vehicles are often operated under conditions in which engine and transmission oils may become overheated. While historically, properly functioning engine coolant systems maintained engine temperatures and the temperatures of connected transmissions at temperatures which were low enough to avoid significant degradation of engine and transmission oils, such is no longer the case. Cooling systems for vehicle engines in the past maintained the coolant at temperatures of the order of 180° F. now the typical minimum temperature. Once pressurized systems were developed maximum coolant temperatures were elevated to 100° Centigrade (212° F.). In order to improve engine performance and to meet emission control requirements, engine coolants have since come to be maintained at maximum temperatures of the order of 105° C. (220° F.). Maximum coolant temperatures continue to increase to anticipated, if not already achieved, temperatures of the order of 110° C. (230° F.) and even higher.

When the temperature of the coolant is elevated, obviously the temperature of the engine itself is elevated and with it the temperature of lubricating and transmission oils. When oil is heated, its viscosity is reduced and with it, its lubricating qualities. Moreover, if the temperature of transmission or lubricating oil is sufficiently elevated, molecular chains of the oil are broken down and the lubricating qualities of the oil can be seriously degraded.

Heat exchangers for cooling engine lubricants with engine coolants are well known. As operating temperatures have elevated, such lubricant cooling systems are, at least in many instances, no longer adequate to maintain the lubricant below an appropriate maximum temperature.

There have been proposals to provide supplemental cooling of lubricating oil through the use of auxiliary heat exchangers connected in series with a primary heat exchanger. With such a proposal, lubricating oil is fed through a series connected heat exchanger when the primary heat exchanger is no longer able to reduce engine oil temperature to a desired operating level.

SUMMARY OF THE INVENTION

According to the present invention, a supplemental engine or transmission oil heat exchanger is connected in parallel with a primary heat exchanger. This parallel arrangement has significant advantages over prior proposals for supplemental cooling of engine and transmission oils. The advantages include:

1) The system is easily connected to a conventional engine. This permits a manufacturer to use the same basic engine design for vehicles to be operated at elevated coolant temperatures as is used for vehicles at traditional coolant temperatures.

2) The system permits effective operation at lower oil pressures than are required when the oil to be cooled is being forced through series connected heat exchangers. As a consequence, combined oil pressure drop and the necessarily pump energy to force the oil through the heat exchangers is significantly reduced.

3) The cooling capacity for the oil being cooled and the temperature of it is controlled by a simple restricter/shut-off valve.

4) A low pressure parallel system is safer for the engine in case of leakage. Thus, a "limp home" function is achieved by shutting off the circuit in the event that there is leakage.

5) A parallel heat exchanger has the ability to cool oil to temperatures well below the temperature exiting an engine coolant heat exchanger permitting the routing of lubricating oil at two different temperatures to different locations in the engine thereby enhancing the lubrication and cooling of the engine.

Accordingly, the objects of the invention are to provide a novel and improved oil cooling system for a vehicle and a process of cooling oil.

DETAILED DESCRIPTION OF THE INVENTION

Figure 1:
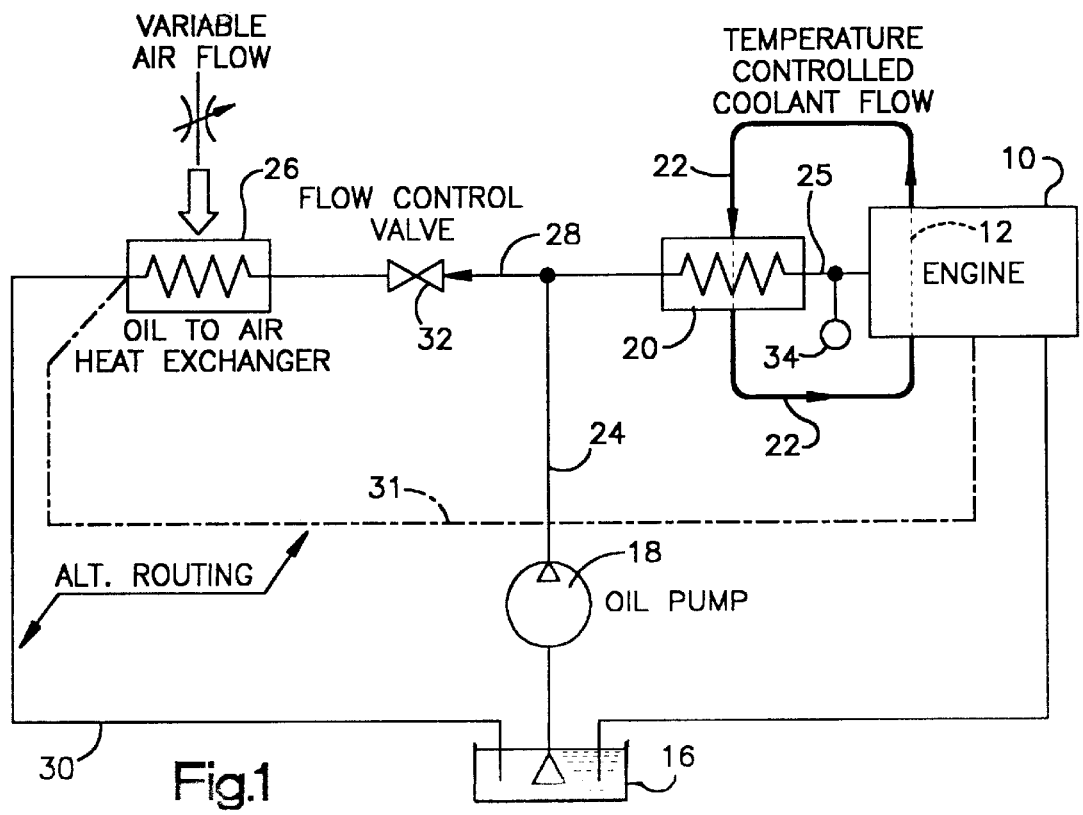
FIG. 1 is a schematic flow diagram of a preferred embodiment of this invention.

Referring now to the drawings an internal combustion engine is shown schematically at 10. In an over the highway truck or tractor application, the engine will typically be a diesel engine. The engine has a liquid cooling system including a radiator 12. The radiator 12 is a heat exchanger which relies on a flow of air indicated by an arrow A in FIGS. 2 and 3 to extract heat from coolant flowing through the radiator.

Coolant flow from the engine to the radiator and return is under control of a thermostat 14, which typically remains closed preventing circulation following startup until coolant temperature typically reaches 180° F. Once the thermostat 14 has opened, a coolant pump shown at 15 in FIGS. 2 and 3 circulates coolant from the engine to and through the radiator 12 and return.

The engine includes an oil pan shown schematically at 16. In operation, an oil pump 18 circulates lubricating oil from the pan 16 through the engine 10 to lubricate relatively moving parts and to cool certain parts such as pistons. With the system of the present invention, oil from the pan is also circulated to a liquid to liquid heat exchanger 20. The heat exchanger 20 is coupled by conduits 22 to the cooling system including the radiator 12. Thus, oil routed by the oil pump 18 (or a parallel oil pump which may be provided) passes from the pump 18 through a conduit 24 to and through the heat exchanger 20 and back to the engines lubricating system via conduit 25.

An air to oil heat exchanger 26 is provided. The air to oil heat exchanger 26 is a supplemental heat exchanger connected in parallel with the primary heat exchanger 20. A conduit 28 couples the conduit 24 to the supplemental heat exchanger 26 while a return conduit couples the auxiliary heat exchanger with the pan 16. Alternatively, lubricating oil exiting the auxiliary heat exchanger 26 is routed to the engine via conduit 31 shown in dotted lines in FIG. 1.

A flow control valve 32 is connected in the conduit 28. A temperature sensor 34 senses the temperature of lubricating oil exiting the primary heat exchanger 20 via the conduit 25. When the sensed oil temperature is above a predetermined desirable level, the temperature sensor emits a signal which causes the flow control valve 32 to open to provide additional cooling of the lubricating oil. Thus, when the temperature of the lubricating oil is above the predetermined desired temperature, the heat exchangers 20 and 26 operate in parallel to reduce lubricating oil temperature. When the temperature sensor 34 senses a temperature below the predetermined temperature, the flow control valve 32 is closed such that fluid communication of the lubricating oil to the auxiliary heat exchanger 26 is prevented.

Figure 2:
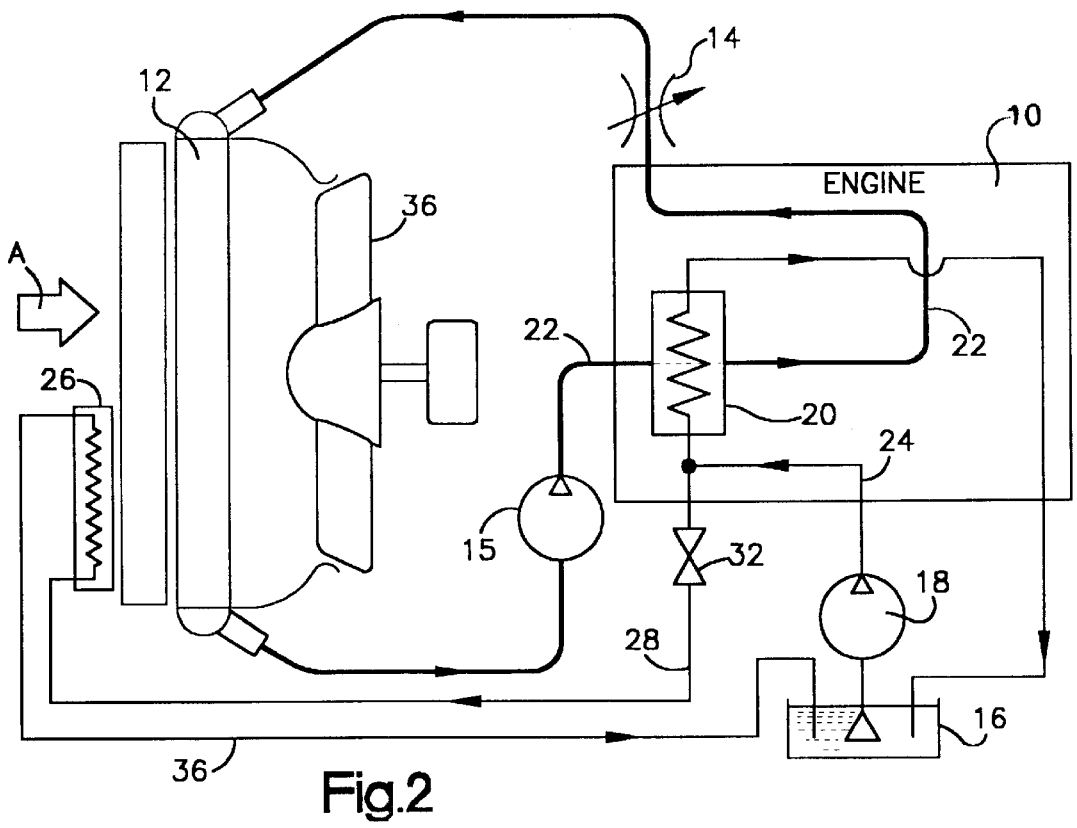
FIG. 2 diagrammatically illustrates a typical installation of the preferred embodiment of FIG. 1 in a vehicle; and, FIG. 3 illustrates alternate embodiments of the system of the present invention.
Figure 3:
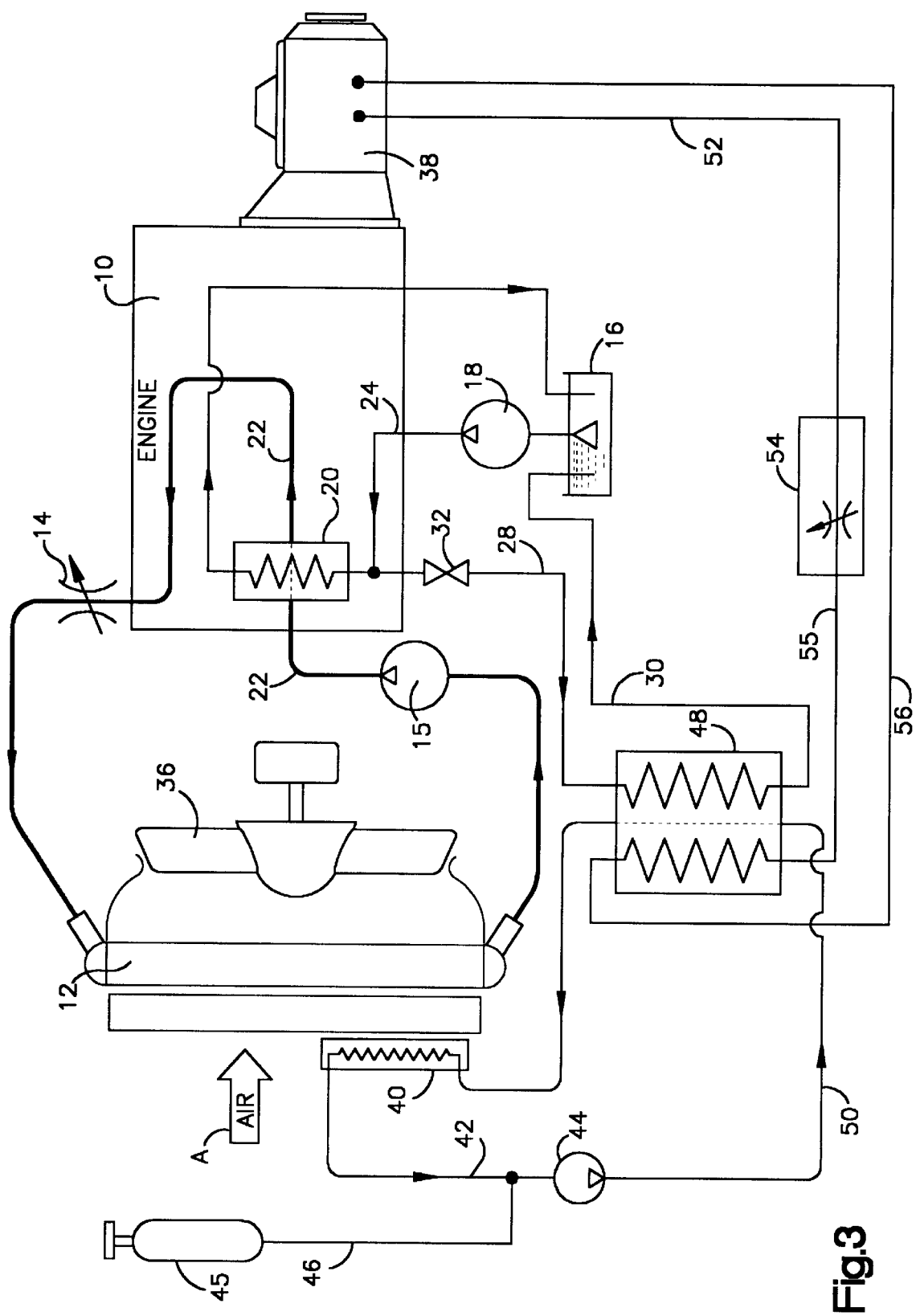

Referring now to FIG. 3, a variable speed cooling fan is shown at 36. The fan is also shown in FIG. 2. The fan is a typical fan which functions to draw air flow as indicated by the arrow A through the radiator 12. In FIGS. 2 and 3, the supplemental heat exchanger 26 is shown in front of radiator 12 such that the air flow indicated by the arrow A cools the supplemental heat exchanger. In some applications, it is desirable to position the supplemental heat exchanger elsewhere so that the radiator 12 receives the full benefit of the air flow A. When the supplemental heat exchanger is positioned elsewhere, a supplemental exchanger fan, not shown, is preferably provided to cause sufficient cooling air flow over the supplemental heat exchanger.

In the FIG. 3 embodiment, a transmission 38 is also shown. An auxiliary coolant radiator 40 is provided. The auxiliary coolant radiator 40 is connected via a conduit 42 to an auxiliary cooling pump 44. An expansion tank 45 is coupled with the conduit 42 via a further conduit 46. The auxiliary pump 44 is coupled to an auxiliary heat exchanger 48 via a conduit 50.

In the embodiment of FIG. 3, oil is routed from the flow control valve 32 through the conduit 28' to the auxiliary heat exchanger 48 and then via a return conduit 30' to the pan 16.

A conduit 52 couples the transmission 38 to a temperature responsive control valve 54. When the temperature of transmission oil exceeds a predetermined temperature, the flow control valve 54 will open and transmission oil will flow via the conduit 52, the flow control valve 54 and then via a conduit 55 to the auxiliary heat exchanger 48. Return flow of transmission oil from the auxiliary heat exchanger 48 is via a conduit 56.

In so far as engine lubricant cooling is concerned, the system of FIG. 3 is the same of that of FIGS. 1 and 2 except that a liquid to liquid heat exchanger 48 has been substituted for an oil to air heat exchanger 26 and an auxiliary radiator 40 has been provided. In addition, cooling of transmission lubricant via the auxiliary heat exchanger 48 is provided. It is well within the scope of this invention to provide a coupling of transmission oil to an oil to air heat exchanger in lieu of a liquid to liquid heat exchanger 48. In addition, individual transmission and engine lubricant heat exchangers rather than the joint heat exchanger 48 of FIG. 3 are fully within the scope of this invention.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. In a vehicle having a transmission and an internal combustion engine equipped with an engine cooling system, a fluid cooling system comprising:

a) a liquid to liquid heat exchanger connected to the engine cooling system and connected to a selected one of an engine lubricant system and a transmission liquid system for cooling circulation of a system liquid from the selected one through the liquid to liquid heat exchanger;

b) a cooling fluid to liquid heat exchanger connected to said selected one and adapted to receive said cooling fluid for cooling circulation of the selected system liquid; and, c) the heat exchangers being connected to the selected system in parallel.

2. The cooling system of claim 1, wherein the selected system liquid is engine lubricant.

3. The cooling system of claim 2, wherein the cooling fluid is air.

4. The cooling system of claim 2, wherein the cooling fluid is a liquid.

5. The cooling system of claim 1, wherein the system liquid is transmission oil.

6. The cooling system of claim 5, wherein the cooling fluid is air.

7. The cooling system of claim 5, wherein the cooling fluid is a liquid.

8. The cooling system of claim 1, wherein the cooling fluid is air.

9. The cooling system of claim 1, wherein the cooling fluid is a liquid.

10. The cooling system of claim 1, wherein the system liquid is circulated through the cooling fluid to liquid heat exchanger when such system liquid exits the liquid to liquid heat exchanger at a temperature in excess of a predetermined temperature.

11. The cooling system of claim 10, wherein the lubricant is circulated through the air to liquid heat exchanger when such lubricant exits the liquid to liquid heat exchanger at a temperature in excess of a predetermined temperature.

12. The cooling system of claim 1, wherein the system liquid in such system is prevented from flowing through the cooling fluid to liquid heat exchanger when the system liquid exits the liquid to liquid heat exchanger at a temperature below a predetermined temperature.

13. The cooling system of claim 12, wherein the lubricant is prevented from flowing through the air to liquid heat exchanger when the lubricant exits the liquid to liquid heat exchanger at a temperature below a predetermined temperature.

14. In an over the highway truck or tractor, an engine lubricant cooling system comprising:

a) a liquid to liquid heat exchanger connected to an engine cooling system for circulating engine coolant through the liquid to liquid heat exchanger;

b) the liquid to liquid heat exchanger also being connected to an engine lubricant system for circulating lubricant through the liquid to liquid heat exchanger for cooling such lubricant;

c) an air to liquid heat exchanger connected to the lubricant system for circulating lubricant through the air to liquid heat exchanger for further cooling of such lubricant;

d) the air to liquid heat exchanger also being positioned to receive a flow of cooling air therethrough when the vehicle is in operation; and e) the heat exchangers being connected in parallel.

15. A vehicle comprising:

a) a power train including an internal combustion engine and a transmission;

b) the engine including a cooling system for circulating liquid coolant through the engine to maintain engine operating temperatures within a predetermined operating range, c) the engine also including an oil pan and a lubricant circulating system for circulating lubricating oil from the pan through the engine and return;

d) the transmission including a transmission oil system for lubricating transmission gears;

e) a primary heat exchanger connected to the cooling system and a selected one of the engine and transmission for cooling circulation of oil through the primary heat exchanger; and f) an auxiliary heat exchanger connected to said selected one in parallel with the primary heat exchanger.

16. The vehicle of claim 15, wherein the selected one is the engine.

17. The vehicle of claim 15, wherein the selected one is the transmission.

18. The vehicle of claim 15, wherein the auxiliary heat exchanger is cooled by a flow of air.

19. The vehicle of claim 15, wherein the auxiliary heat exchanger is cooled by a flow of liquid coolant from an auxiliary source.

20. The vehicle of claim 15, wherein a temperature sensor senses the temperature of oil exiting the primary heat exchanger and a sensor controlled valve enables oil flow through the auxiliary heat exchanger when the sensored temperature exceeds a predetermined level and disables flow through the auxiliary heat exchanger when the sensed temperature is below the predetermined level.

21. The combination of claim 15 wherein the vehicle is a heavy duty over the highway truck or tractor.

* * * * *